United States Patent [19]

Oyama et al.

[11] Patent Number: 5,303,272
[45] Date of Patent: Apr. 12, 1994

[54] APPARATUS FOR OPERATING THE GRID SPRINGS OF NUCLEAR FUEL ASSEMBLY

[75] Inventors: Junichi Oyama; Akio Sando; Shuji Yamazaki, all of Ibaraki, Japan

[73] Assignee: Mitsubishi Nuclear Fuel Co., Tokyo, Japan

[21] Appl. No.: 964,073

[22] Filed: Oct. 21, 1992

[30] Foreign Application Priority Data

Oct. 24, 1991 [JP] Japan .................. 3-278098

[51] Int. Cl.⁵ .......................................... G21C 19/00
[52] U.S. Cl. ................................ 376/261; 376/446
[58] Field of Search ............. 376/261, 245, 262, 446; 976/DIG. 68, DIG. 231, DIG. 273; 29/723, 426.2

[56] References Cited

U.S. PATENT DOCUMENTS

| | | | |
|---|---|---|---|
| 4,058,224 | 11/1977 | Jabsen | 214/1 CM |
| 4,124,444 | 11/1978 | Jabsen . | |
| 4,659,537 | 4/1987 | Beuneche et al. | 376/261 |
| 4,729,867 | 3/1988 | De Mario . | |
| 5,068,081 | 11/1991 | Oyama et al. . | |
| 5,133,927 | 7/1992 | Kadano et al. | 376/462 |

FOREIGN PATENT DOCUMENTS

0196609 10/1986 European Pat. Off. .
0251317 1/1988 European Pat. Off. .
3938163 5/1990 Fed. Rep. of Germany .

*Primary Examiner*—Donald P. Walsh
*Assistant Examiner*—Meena Chelliah
*Attorney, Agent, or Firm*—Oblon, Spivak, McClelland, Maier & Neustadt

[57] ABSTRACT

The present invention relates to an apparatus for manipulating the springs which hold the fuel rods firmly inside the grid cells of the grids in a nuclear fuel assembly. Conventionally fuel rods are inserted into the grids while the grid springs are in the active position, thus exposing the rods to possibilities of surface scratches and potential problems. The invented automatic apparatus avoids the formation of such surface damage on the fuel rods, by inserting the keys to inactivate the grid springs before inserting the fuel rods into the grids and removing the keys after all the rods are in place. The apparatus thus contributes to efficient manufacturing of the fuel assembly by simplifying the key quantity management operations and other tasks associated with the assembling operations.

8 Claims, 8 Drawing Sheets

APPARATUS FOR OPERATING THE GRID SPRINGS OF NUCLEAR FUEL ASSEMBLY

BACKGROUND OF THE INVENTION

1. Field of the Invention

The present invention relates to a nuclear fuel assembly for use in nuclear reactors, and in particular, to an apparatus for operating the hold down springs, grid springs, provided in the grids of the nuclear fuel assembly for holding the fuel rods firmly therein.

2. Background Art

Fuel rod assemblies such as the one disclosed in U.S. Pat. No. 5,068,081 shown in FIG. 6 have been known.

In this figure, the numerals 1 and 2 refer to a top nozzle and a bottom nozzles, respectively, which are disposed vertically and oppositely spaced apart, and between the top nozzle 1 and the bottom nozzle 2 are a plurality of rigidly fixed control-rod guide pipes 3 (hereinbelow referred to as guide pipes 3), and in the mid section of the guide pipes 3 are a plurality of grids 4 disposed vertically and spaced apart from each other.

The grids 4 are, as shown in FIGS. 7 to 11, constructed of a plurality of outer straps 7a (the straps placed on the outer sides of the grids 4) made of thin metal strips, and inner straps 7b (all other straps) having slits 8 spaced at regular intervals in the longitudinal direction. By inserting the slits 8 into each other's slits 8, a plurality of grid cell spaces 5 (hereinbelow referred to as grid cells 5) are formed. Each wall of the grid cells 5 is provided with a dimple 9, and outer springs 10a (which are formed on the outer straps 7a), or inner springs 10b (which are formed on the inner straps 7b). A fuel rod 6 inserted into a grid cell 5 is pressed against the dimple 9 by either the outer spring 10a or by the inner spring 10b, thereby supporting the fuel rod 6 firmly in the grid cell 5 with the springs.

The outer strap 7a has a pair of slits 11 which pass through both sides of the outer spring 10a.

The conventional method of assembling such a fuel assembly will be described.

First, the grids 4 are placed apart with a certain distance. The guide pipes 3 are inserted into the specified oppositely paired grid cells 5, and are then rigidly attached to the grids 4. Subsequently, the fuel rods 6 are inserted into the space of the grid cells 5 by sliding the rods 6 against the outer and inner springs 10a-10b and dimples 9. The rods 6 are thereby secured in the grid cells 5 via the pressing force exerted by the springs 10a-10b against the dimples 9. When all of the rods 6 are inserted into the grid cells 5, the top and bottom nozzles 1 and 2 are firmly attached to the opposite ends of the respective guide pipes 3.

In the conventional assembling method described above, when the rods 6 are being inserted, by sliding through the dimples 9 and springs 10a-10b, surface damage (fine scratches) were sometimes introduced on the surface of the fuel rods 6.

Therefore, there has been a technique to prevent the formation of such scratches, with the use of an inner key 12, shown in FIG. 11, which is inserted into a grid cell 5, so as to retract the inner spring 10b away from the grid cell 5, before inserting the fuel rod 6. Similarly for the outer springs 10a, the use of such keys has been examined.

In the conventional method, however, the operations involving the key insertion have been performed manually, and the entire operation has been troubled by the process inefficiency due to cumbersome and lengthy steps. Further, the care of the key quantity was difficult to take, because of the large number of keys involved.

SUMMARY OF THE INVENTION

The present invention was made in view of the above problems in the conventional method, and an objective is to provide an apparatus which perform the procedure for deactivating and activating the retention springs efficiently, and also includes an objective to provide an efficient care of key quantity and other works associated with the key operations.

An apparatus of the present invention is for the purpose of manipulating springs which firmly hold nuclear fuel rods in a plurality of grid cells of a plurality of grids in a fuel assembly, while each of the grids has a plurality of grid cells formed with inner straps and outer straps, and the springs are formed on the inner straps and on the outer straps so as to protrude into the grid cells and to hold the fuel rods by contacting the surface of the fuel rods; the apparatus comprises:

(a) a grid support body;

(b) outer spring manipulator means, disposed on the support body at a position to correspond with the outer springs formed on outer strips, for manipulating outer springs so as to retract the outer springs from the grid cells; and (c) inner key manipulating means for manipulating inner springs so as to retract the inner springs formed on the inner straps from the grid cells by inserting a key into each grid cell of the grids, and rotating the key around the axis thereof.

The apparatus of the above construction performs insertion/retraction of the keys efficiently and simplifies the tasks associated with the key operations such as the care of key quantity and other jobs.

PREFERRED EMBODIMENTS OF THE INVENTION

Figure 1:
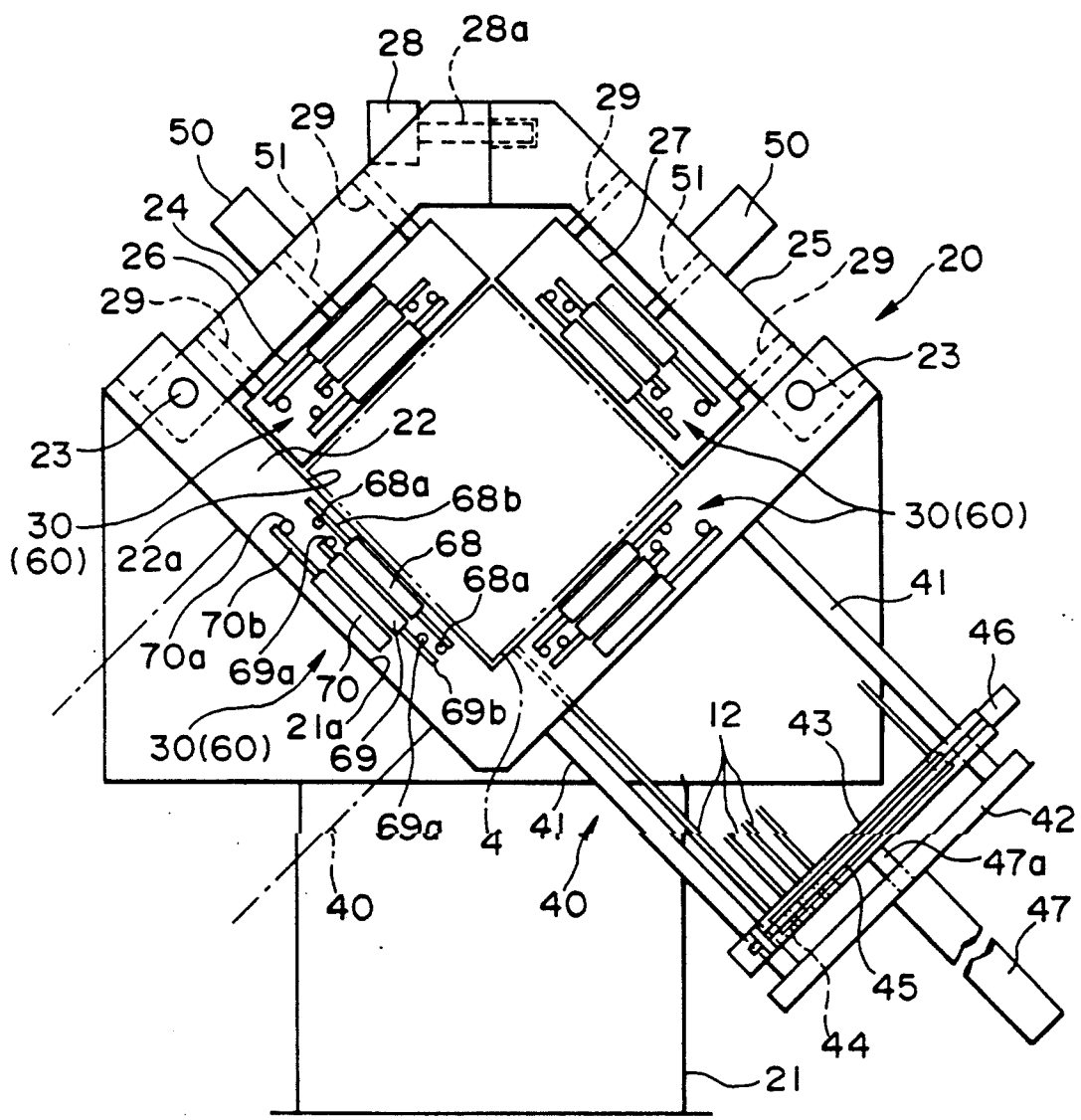
FIG. 1 is a schematic front view of a key manipulator apparatus of the present invention.

The preferred embodiments of the invention will be explained with reference to FIGS. 1 to 5. In the following, the structures which are common to the conventional fuel assembly are given the same designations, and their detailed explanations are omitted.

The key manipulator in the embodiment comprises:

a plurality of grid supports 20 the number of which is equal to the number of grids 4 (but in FIG. 1 only one unit is shown), and disposed in the direction of the fuel rod 6, wherein each of the grid supports 20 has a tetrahedral framework for supporting the outer surface of grid 4 by contacting with the inner surface thereof;

outer spring manipulator 30 fixed on the planes of the grid support 20 facing the outer strap 7a for retracting the outer spring 10a;

an inner key manipulator 40 fixed to the grid support 20 for retracting the inner spring 10b formed on the inner strap 7b, by inserting an inner key 12 into the grid 4 and turning the key 12 around the axis thereof.

A grid support 20 comprises:

a base 21;

an L-shaped main support body 22 attached to the upper surface 21a of the base 21 and supports the grid 4 at its inner surface 22a;

frames 24–25 which are attached freely rotatably to the ends of the main support body 22 with pins 23;

roughly square-rod shaped clamping parts 26–27 disposed on the inner surfaces of the frames 24–25 (opposite surface to the main support body 22), and which is raised or lowered via rod 51 by means of a clamp elevator cylinder 50;

a fluid-operated frame locking cylinder 28 (a connecting mechanism) attached to a frame 24 of the frames 24–25, and having a locking rod 28a whose tip is inserted freely removably into the other frame 25.

On the exterior surface of the clamping parts 26–27, are disposed guide pins 29 which are freely slidably against the frames 24–25.

Two outer spring manipulators 30 are attached to the inner surface of the main support body 22 of the grid support 20, and one each to the inner surfaces of the clamping parts 26–27 so as to face each of the outer strap 7a of the grid 4.

All of the four outer spring manipulators 30 have the same construction, and the following explanation is provided only for one which is attached to the main support body 22, and explanations for others are omitted.

Figure 2:
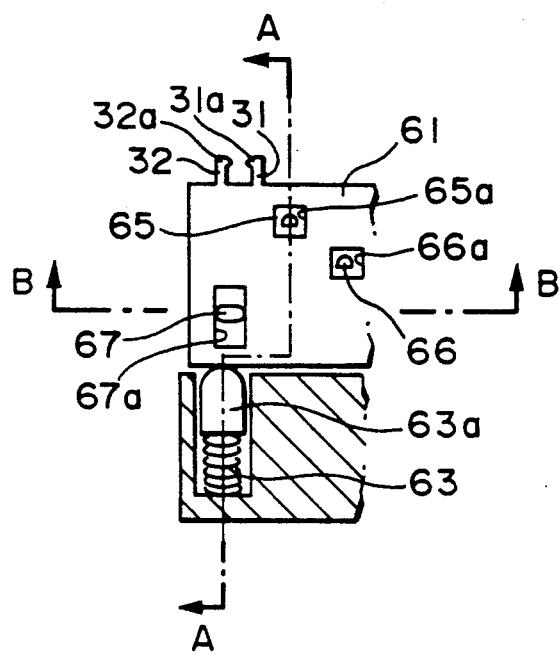
FIG. 2 is a cross sectional view of the main sections of a hooking mechanism used in an embodiment viewed along an axis perpendicular to the cam axis.

The outer spring manipulator 30, shown in FIG. 2, comprises:

a plurality of pairs of hook stems 31–32, which are inserted into the slit 11, extending from the support body 22 towards the outer strap 7a in such a way to clasp the outer spring 10a therebetween (in FIGS. 2 and 3, only a pair of the hook stems 31–32 is shown); and hook parts 31a–32a which extend from the opposing side surfaces of the hook stems 31–32; and a hook manipulator 60 which, after passing the hook stems 31–32 into the slit 11, squeezes the paired hook stems 31–32 together and engages the hooks 31a–32a to the spring 10a by moving the hook stems 31–32 away from the grid cell 5.

In the following, the construction of the hook manipulator 60 will be explained with reference to FIGS. 1 to 4.

Figure 3:
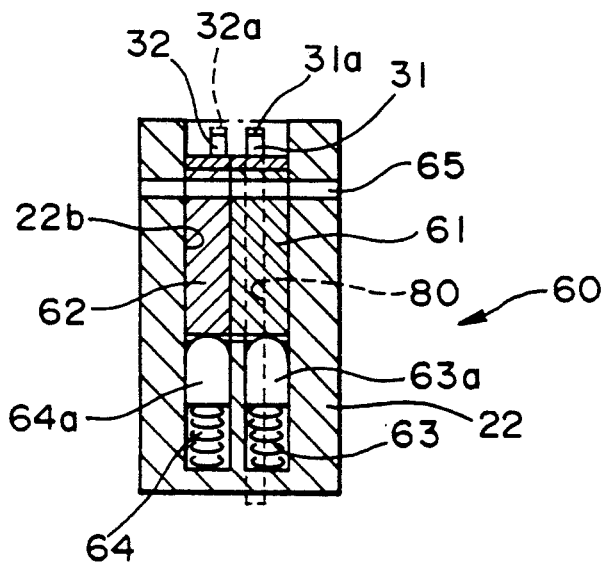
FIG. 3 is a cross sectional view in the plane along the line A—A in FIG. 2.
Figure 4:
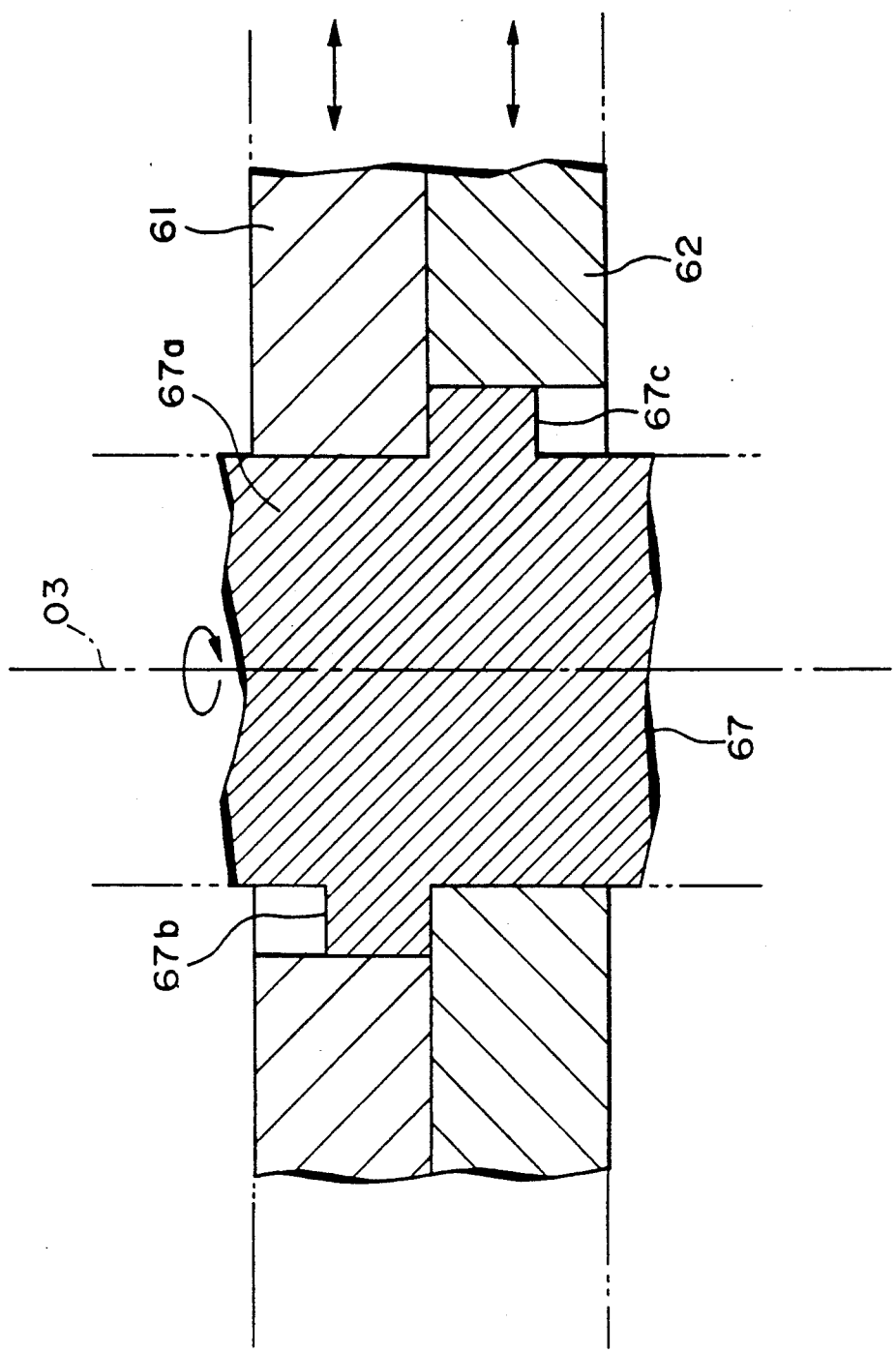
FIG. 4 is an enlarged cross sectional view in the plane along the line B—B in FIG. 2.

The hook manipulator 60 comprises:

a rectangular-shaped first sliding plate 61 having a plurality of hook stems 31 protruding out at regular intervals toward the interior of the grid 4, and disposed inside a cavity 22b which is formed longitudinally along the support body 22 (refer to FIG. 3);

a second sliding plate 62 of the same shape as the first sliding plate 61 having a plurality of hook stems 32 protruding out at regular intervals toward the interior of the grid 4, and disposed inside the cavity 22b along side the sliding plate 61;

coil springs 63–64 which force the first and second sliding plates 61–62 towards the interior of the grid 4 through the push pins 63a–64a;

two through holes 65a (refer to FIG. 2 which shows only one of such holes) which pass through the two sliding plates 61–62 in the thickness direction, and spaced apart in the length direction of the sliding plates 61–62;

home-position cams 65 of a semi-circular cylinder shape each of which is placed inside the two through holes 65a;

two through holes 66a (only one shown in FIG. 2) which are formed in about the same way as the two through holes 65a;

operational-position cams 66 which are made about the same cross sectional shape as the home-position cams 65, having slightly a smaller diameter, each being housed in the through holes 66a;

a valve cam 67 having protrusion portions 67b–67c (refer to FIGS. 4 and 5) formed on the opposite sides of the valve cam 67 so that the protrusion portions are displaced axially, and contained in a through hole 67a which is formed in about the same way as the through hole 65a;

driving cylinders 68 for driving the two home-position cams 65 by the rack 68b through pinion 68a (refer to FIG. 1) fixed to each end of the home-position cams 65;

driving cylinders 69 which similarly drive the operational-position cams 66 through pinion 69a–rack 69b; and driving cylinders 70 which similarly drive the valve cam 67 through pinion 70a–rack 70b.

On the support body 22 and the first sliding plate 61 fitted therein is disposed a through hole 80 (refer to FIG. 3) extending lengthwise, at the position to correspond with the insertion of the key 12, thereby enabling the key 12 to be inserted into the grid 4.

Two inner key manipulators 40 are disposed on the outer surface of the support body 22 of the grid support 20, as shown in FIG. 1. The two manipulators 40 are constructed the same way, and therefore, the operation of only one manipulator 40 will be explained, and the explanation for the other unit shown by the dashed line in FIG. 1 on the lower left will be omitted.

The inner key manipulator 40 comprises:

two slide guide rails 41 extending out of the support body 22;

a base plate 42 spanning across the slide guide rails 41 at the tip thereof;

key insertion device 43 extending lengthwise and engaged slidingly to the pair of slide guide rails 41;

a plurality of pinions 44, disposed along the lengthwise direction in the base of the key insertion device 43, whose axes extend in the direction of the slide guide rails 41, and having one end of the inner key attached thereto;

a key rotating cylinder 46 (returning means) for rotating the pinion 44 through the rack 45 disposed on the side of the fuel assembly of the key insertion base 43;

a key transfer cylinder 47 (transfer means) which is disposed on the far-side of the fuel assembly of the base plate 42, and moves the insertion base 43, via extension rod 47a, towards and away from the grid 4.

Next, the operational process of the manipulator apparatus according to the embodiment will be described. First, by operating the clamp elevator cylinder 50, the clamping parts 26-27 is made to approach the frame 24-25 so as to position the grid 4 within the framework of the support body 22. By means of the clamp elevator cylinder 50, the clamping parts 26-27 are made to clamp the outside surface of the grid 4, thereby fixing the grid to the grid support 20.

Next, with the use of the outer spring manipulator 30, the outer spring 10a of the grid 4 is retracted from the grid cell 5. This operation will be explained in detail with reference to FIG. 5. In this figure, to simplify the illustration, at the topmost section of the figure, (a) refers to the home-position cam 65 (hp cam 65); (b) refers to the operational-position cam 66 (op cam 66); and (c) refers to the valve cam 67 (v cam 67).

Figure 5:
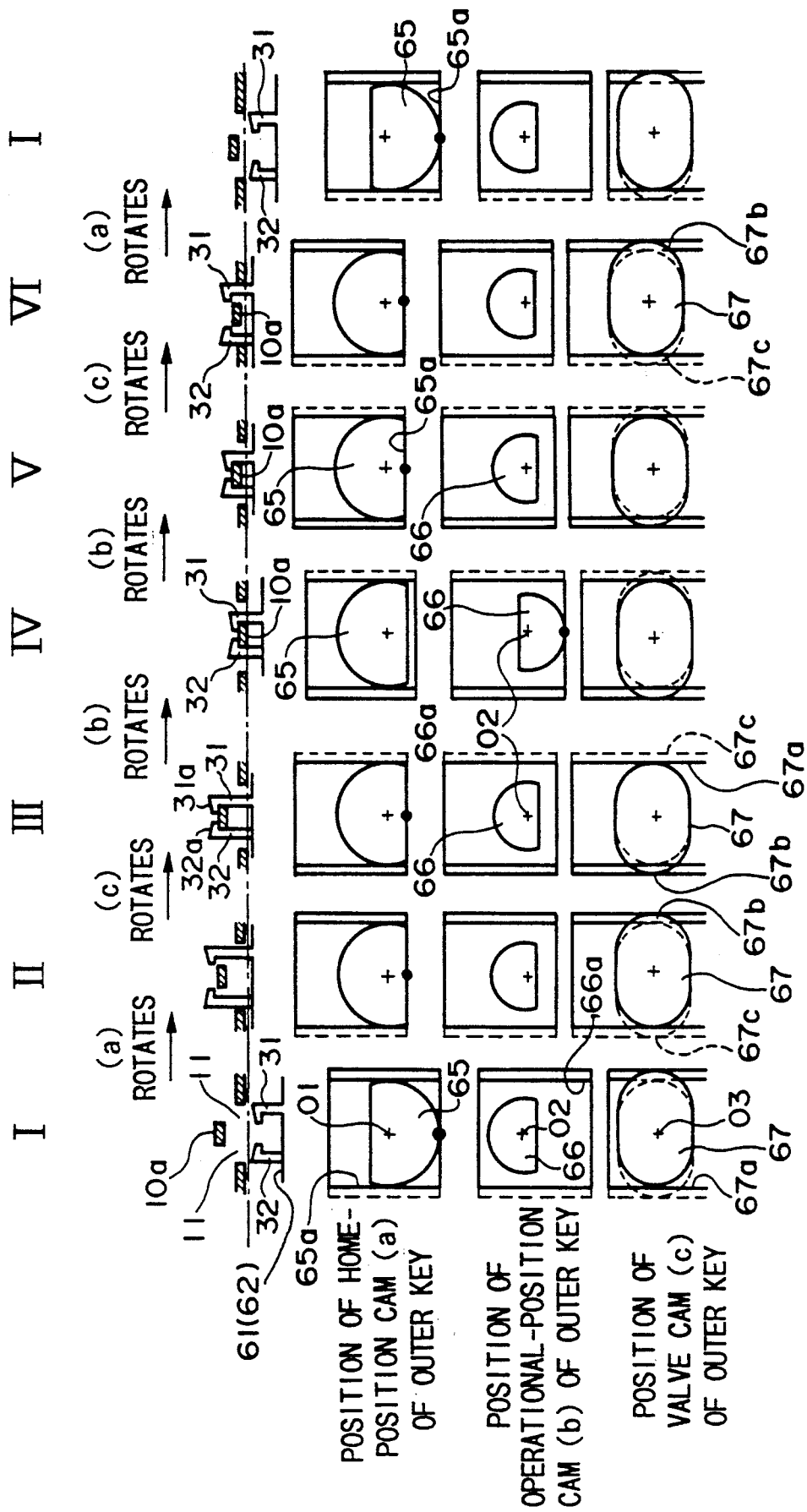
FIG. 5 is an illustration to show the movement of the hook operating mechanism.
Figure 6:
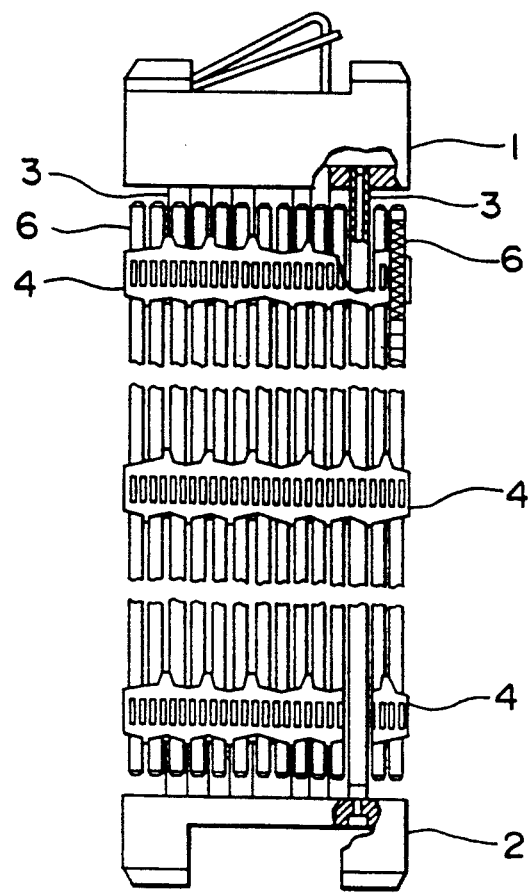
FIG. 6 is a front view of the conventional nuclear fuel assembly.
Figure 7:
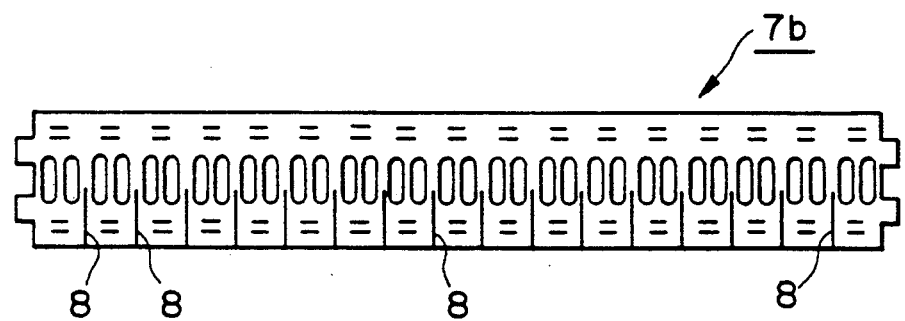
FIG. 7 is a front view of an inner strap which forms the grids.
Figure 8:
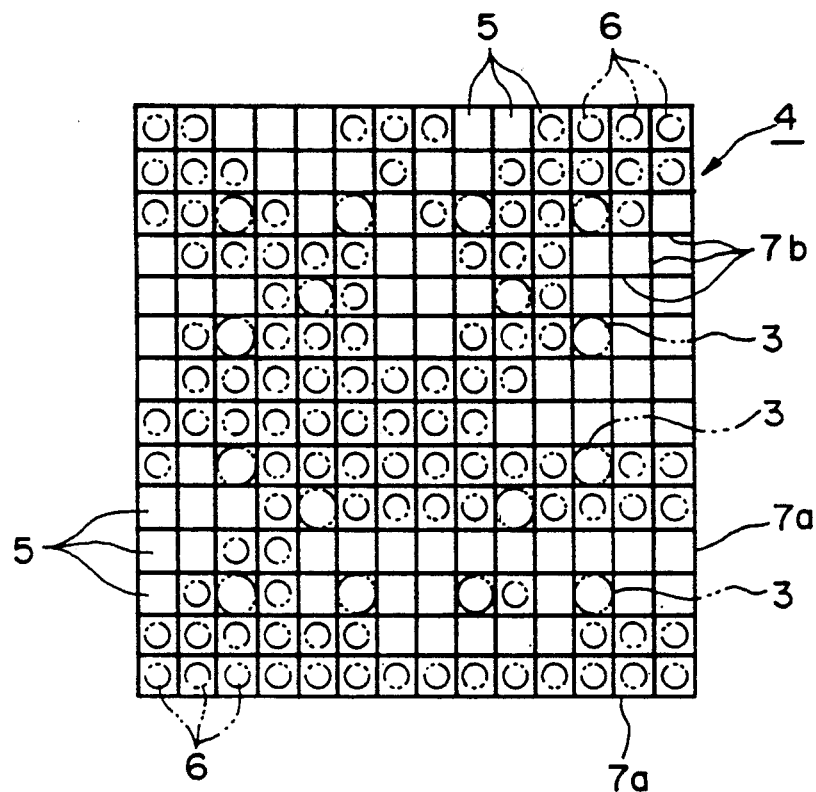
FIG. 8 is a plan view of a grid.
Figure 9:
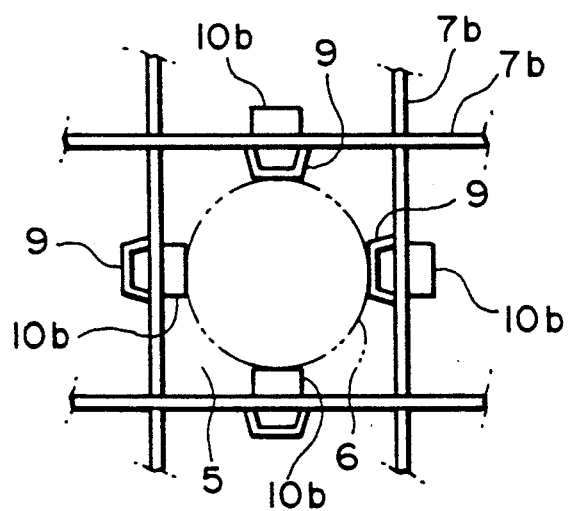
FIG. 9 is an enlarged plan view showing the sections of a grid cell.
Figure 10:
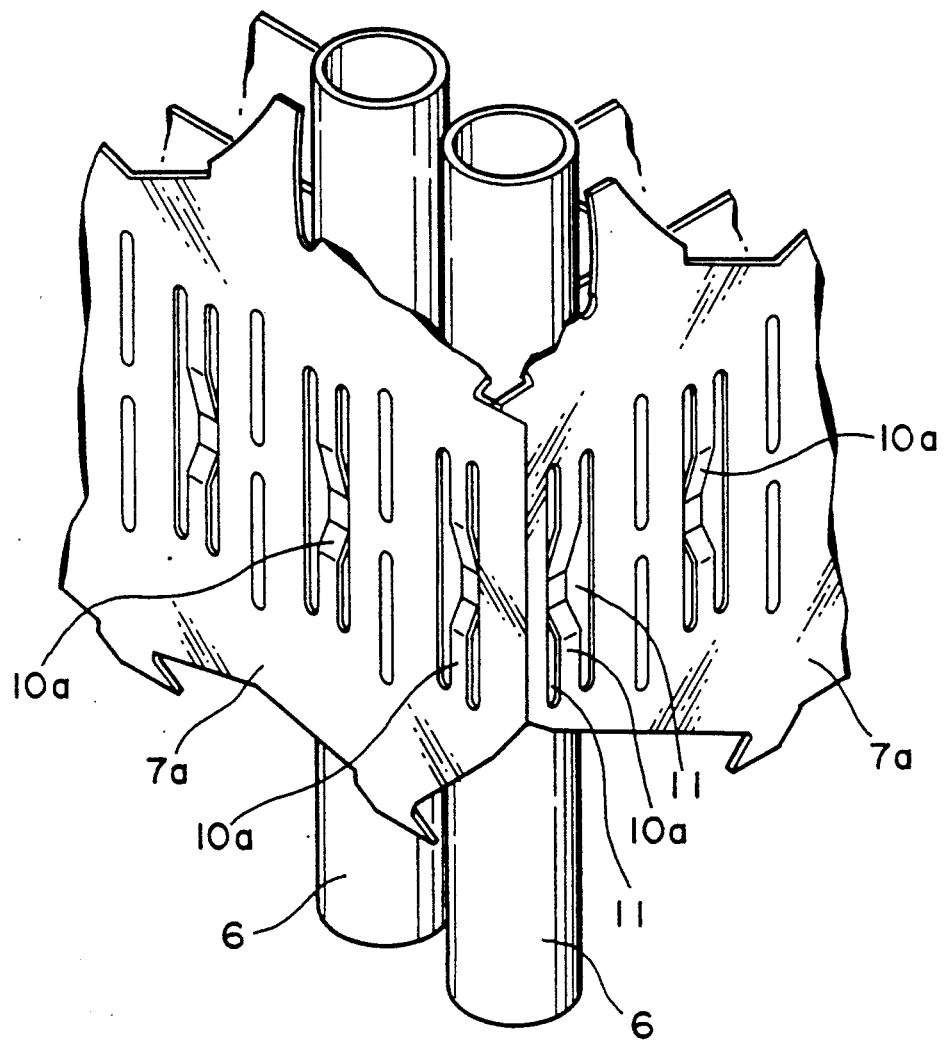
FIG. 10 is an enlarged perspective view of an outer strap which forms a grid.
Figure 11:
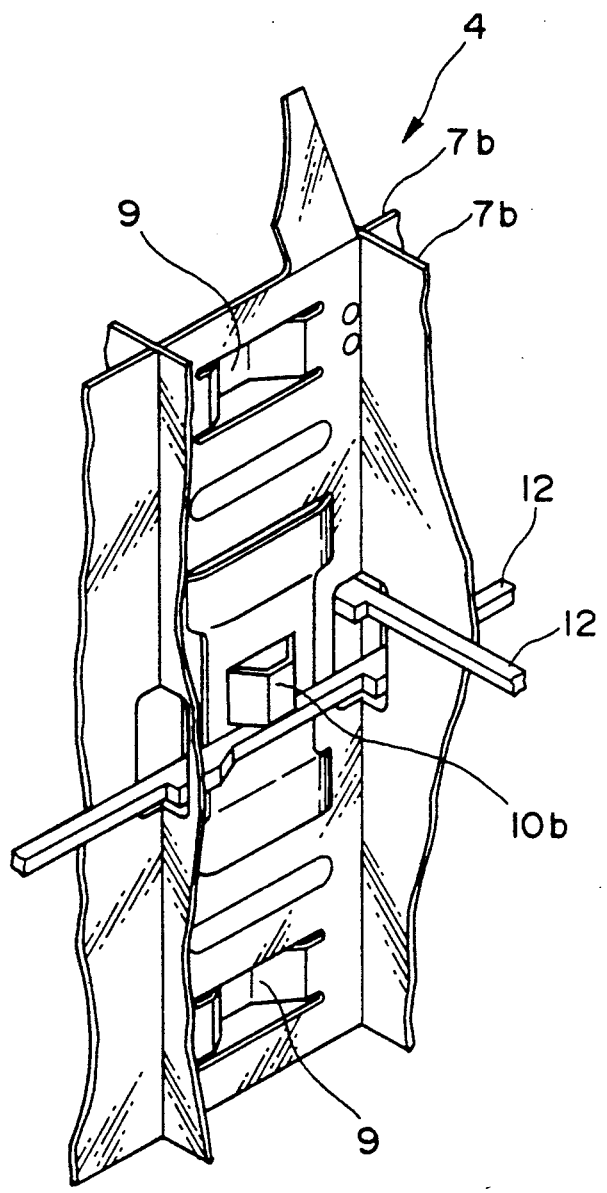
FIG. 11 is an enlarged perspective view showing an inner key inserted into the grid.

First, in the initial stage (in FIG. 5, the state shown in (I), far left of the figure), the first and the second sliding plates 61-62 are pressed toward the grid 4, by the spring force of the coil springs 63-64, and the arc surface of the hp cam 65 is in contact with the inside surface of the through hole 65a, thereby preventing the movement of the first and the second sliding plates 61-62 toward the grid 4. Next, the op cam 65 is rotated 180 degrees around its axis 01 (in FIG. 5, the state shown in (II)), and the flat surface of the hp cam 65 is made to contact the inside surface of the through hole 65a. Because the distance between the flat surface of the hp cam 65 to its axial center 01 is made to be shorter than the distance between its axial center to the arc surface, the first and the second sliding plates 61-62 can now be moved a distance toward the grid 4, thereby allowing a pair of hook stems 31-32 into the slit 11 formed on the outer strap 7a.

Next, the v cam 67 is rotated through 180 degrees around its axis 03 (in FIG. 5, the state shown in (III)). Then positions of the protrusions 67a-67b (refer to FIG. 4) formed on the sides of the v cam 67 are interchanged, thereby the first and the second sliding plates 61-62 are moved relative to each other, thereby squeezing the hook stems 31 and 32, thus engaging the hooks 31a-32a with the outer spring 10a.

Next, the op cam 66 is rotated through 180 degrees about its axis 02, and letting the arc surface of the op cam 66 to be in contact with the inside surface of the through hole 66a, and move the first and the second sliding plates 61-62 slightly away from the grid (in FIG. 5, the state shown in (IV)). This allows the outer spring 10a to be retracted from the grid cell 5 by means of hook stems 31-32.

In the above step, it is also possible to retract the outer spring 10a by rotating the hp cam 65 to return to the initial position, i.e. rotate the hp cam 65 another 180 degrees. However, in so doing, the amount of movement towards the outside (of the assembly) becomes too large, thereby placing a large strain on the outer spring 10a, causing a plastic deformation and decreasing its holding ability. This is not desirable for these springs. According to the present invention because, the outer spring 10a is retracted with use of the op cam 66, the movement thereof remains within an appropriate amount, thereby assuring the firm holding of the fuel rod 6 by the outer spring 10a.

Next, the key transfer cylinder 47 of the inner key manipulator 40 is operated, the key insertion base 43 is moved closer to the grid 4, via extension rod 47a of the cylinder 47, and a plurality of inner keys 12 provide on the base 43 are inserted into the grid 4. Next, the key rotating cylinder 46 is operated, the inner keys are rotated through an appropriate angle (usually 90 degrees) via rack 45 and the pinion 44, thereby retracting the inner spring 10b away from the grid 5.

Next, the fuel rods 6 are inserted into the grids by a suitable means to assemble a fuel assembly. At this time, the inner and outer springs 10b-10a are formed on the grid cells 5 are being retracted, therefore, mechanical interference between the fuel rods 6 and the springs is prevented, thereby avoiding the formation of scratches on the surface of the fuel rods 6.

Then, the key rotating cylinder 46 is again operated, and the inner keys 12 are rotated, via rack 45 and pinion 44, to return them to the initial position. In this state, the inner springs 10b again protrude out into the grid cell 5, thereby contacting the surface of the fuel rods 6 to provide a firm support thereto. Next, the key transfer cylinder 47 is operated to move the key insertion base 43 away from the grid 4, thereby removing the inner keys 12 from the grid, returning them to the initial position.

Next, the op cam 66 of the hook manipulator 60 is rotated through 180 degrees around the axis 02 to return the op cam 66 to the initial position (in FIG. 5, the state shown in (V)). The blocking by the op cam 66 is thus removed; the first and the second sliding plates 61-62 are moved towards the grid 4 by the spring force of the coil springs 63-64; the through hole 65a is made to contact the hp cam 65; thereby permitting the outer spring 10a to protrude into the grid cell 5. In this case, the amount of protrusion is pre-adjusted so that the outer springs 10a would position itself near the surface of the fuel rod 6, therefore, by rotating the op cam 66, the outer springs 10a is automatically positioned near the surface of the fuel rods 6.

Next, the v cam 67 is rotated through 180 degrees around the axis 03 to return it to the initial position. By so doing, the positions of the protrusions 67b-67c formed on the side of the v cam 67 are interchanged; the hook stems 31 and 32 are separated; and disengaging the hooks 31a-32a from the outer spring 10a (the state shown in (VI) in FIG. 5).

After the above step, the outer spring 10a returns slightly toward the grid side, thus contacting the surface of the fuel rod 6, thereby providing firm holding of the fuel rod 6 in the gird cell 5.

Next, the hp cam 65 is rotated through 180 degrees around the axis 01 to return it to the initial position, thus enabling the hook stems 31-32 to be retracted from the slit 11.

Next, the clamp elevator cylinder 50 fixed to the frames 24-25 is operated to slightly separate the clamp holding parts 26-27 from the grid 4. Then, the frame locking cylinder 28 is operated to remove the locking rod 28a from the frame 25, thereby disengaging the locking rod 28a from the frame 25.

Next, the frames 24-25 are rotated through 90 degrees in the direction around the pin 23 to separate the frames 24-25 so as to clear the top space of the grid 4. The assembled grids 4 with the fuel rods 6 therein can then be suspended and transported to a next processing location.

According to the apparatus of the present embodiment, the availability of the outer spring manipulator 30 and the inner spring manipulator 40 provides an advantage that the outer springs 10a and the inner springs 10b formed on the grid 4 can separately and automatically be retracted from the grid cell 5.

According to the apparatus of the present embodiment, the inner key manipulator 40 is provided with a known number of inner keys 12, and therefore, the inner keys need not be handled manually, thus eliminating the necessity for key quantity management, thereby enabling efficient management of the complex grid assembly operation.

The mechanism for rotating the inner keys 12 was constructed of a rack and pinion arrangement in the above embodiment, but it is also permissible to utilize a worm and pinion arrangement. Any arrangement is acceptable so long as it is capable of rotating the inner keys 12 through a specific angle. It is also obvious to replace the rack and pinion arrangement for driving the various cams with a worm and pinion arrangement.

Further, the present invention is not limited to the embodiment presented above, and many variations are possible within the scope defined by the claims which follow.

What is claimed is:

1. A key manipulating apparatus for manipulating inner and outer springs for firmly holding nuclear fuel rods in a plurality of grid cells of a plurality of grids in a fuel assembly, wherein said grids consist essentially of inner straps assembled with outer straps to form said grid cells and said inner and outer springs are formed respectively on said inner straps and on said outer straps so as to protrude into said grid cells and to hold said fuel rods by contacting the surface of said fuel rods; said apparatus comprising:
    (a) a support for supporting said grids;
    (b) outer spring manipulator means, disposed on said support at a position to correspond with said outer springs formed on said outer straps, for manipulating said outer springs so as to retract said outer springs from said grid cells; and
    (c) inner key manipulating means for manipulating said inner springs so as to retract said inner springs formed on said inner straps from said grid cells by inserting a key into each grid cell of said grids, and rotating said key around the axis thereof;
wherein:
    said outer straps are provided with through slits at both sides of said outer springs formed on said outer straps; and
    said outer spring manipulator means comprises a plurality of hook manipulator means;
    said hook manipulator means comprising:
    a pair of hook stems having a set of opposing hooks disposed on opposing end side surfaces of said hook stems for grabbing an outer spring; and
    retraction means for inserting said hook stems into the grid cell through said slits and moving said opposing hook stems toward each other for grabbing and withdrawing said outer spring from the grid cell through the slit.

2. An apparatus for manipulating springs as claimed in claim 1, wherein said support comprises:
    (a) a support base disposed on the ground;
    (b) a L-shaped support body for supporting said grid on internal surfaces thereof;
    (c) a frame disposed freely rotatably on each end section of said grid support so as to form a pair of locking frames for locking said grid;
    (d) a frame locking means disposed on one of said locking frames for joining said frames separatably.

3. An apparatus for manipulating springs as claimed in claim 2, wherein each of said frames are provided with a clamping part, which is freely movable transversely to the fuel rod direction, disposed on an interior surface thereof and operates by contacting the outer surface of said grid.

4. An apparatus for manipulating springs as claimed in claim 2, wherein said frame locking means for said pair of locking frames is a fluid-operated cylinder disposed on one frame of said pair of locking frames, and a tip end of said cylinder is freely insertable into a cavity formed in the other frame of said pair of frames.

5. An apparatus for manipulating springs as claimed in claim 1, wherein said retraction means of said hook manipulator means comprises: a first sliding plate and a second sliding plate disposed in a support body for supporting a grid; and cam mechanisms for providing relative movements of said first sliding plate and said second sliding plate.

6. An apparatus for manipulating springs as claimed in claim 5, wherein said cam mechanisms include cams operatively connected with both said first sliding plate and said second sliding plate by means of through holes disposed on said first sliding plate and said second sliding plate; and a rack and pinion drive for rotating said cams.

7. An apparatus for manipulating springs as claimed in claim 1, wherein said inner key manipulator comprises:
    (a) two slide guide means extending out of said support body;
    (b) key insertion device extending lengthwise and engaged slidingly to said slide guide means;
    (c) pinions disposed freely rotatably on said key insertion device, engaging with said key at the center axis thereof;
    (d) racks coupled to said pinions;
    (e) key rotation means for moving said racks along the direction of extension of racks towards and away from the grid.

8. An apparatus for manipulating springs as claimed in claim 7, wherein said key insertion device is provided with means for moving said device towards and away from said support body.

* * * * *